UNITED STATES PATENT OFFICE.

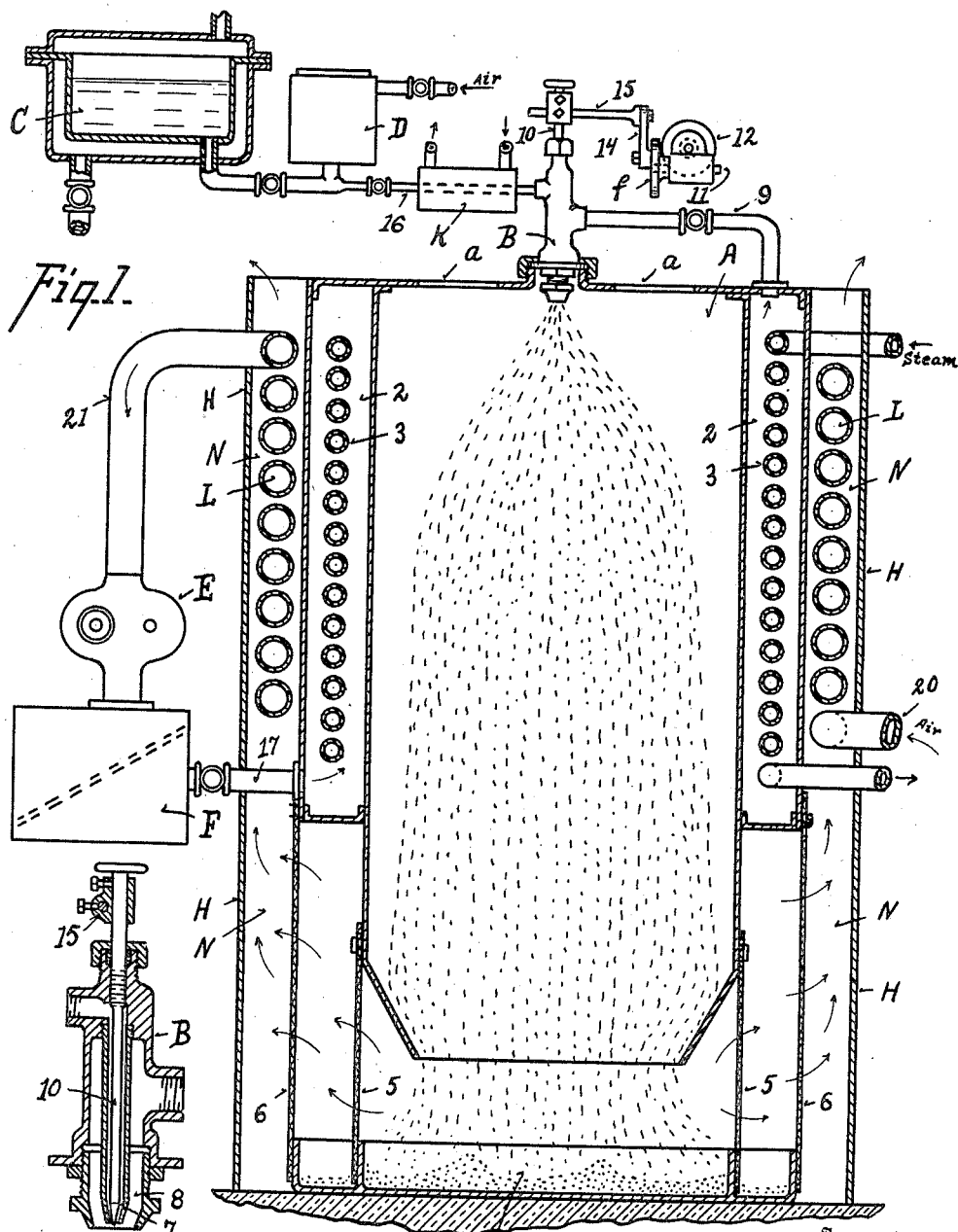

DAVID J. HAUSS, OF AURORA, INDIANA.

PROCESS OF DESICCATING FOOD PRODUCTS.

1,163,339.          Specification of Letters Patent.          Patented Dec. 7, 1915.

Application filed November 16, 1914. Serial No. 872,395.

*To all whom it may concern:*

Be it known that I, DAVID J. HAUSS, a citizen of the United States, residing at Aurora, in the county of Dearborn and State of Indiana, have invented certain new and useful Improvements in Processes of Desiccating Food Products, of which the following is a specification.

My invention relates to a process of preparing desiccated milk and other similar food products in a finely divided state.

One of its objects is to provide an improved method whereby soluble finely divided or flour desiccated milk may be prepared free from mechanical or foreign material, or hard gritty or insoluble lumps or particles, and in sterilized condition.

Another object is to provide an improved method capable of being continuously carried out, and enabling the product to be conveniently isolated and recovered.

My invention also comprises certain details and order of procedure, all of which will be fully set forth in the description of the accompanying drawings in which:

Figure 1 is a diagram illustrating in central vertical section one form of apparatus adapted to carry out my improved process. Fig. 2 is an enlarged sectional detail of a form of atomizing mechanism preferably employed.

The accompanying drawings illustrate the apparatus preferably employed in carrying out my improved process and comprises a desiccating chamber A having a jacket 2 by means of which the side walls of said chamber are heated. Heating coils 3, through which steam or other heating medium is circulated, are located in said jacket, while a current of filtered air is circulated through said jacket to be heated by contact with said coil and thereby uniformly heat the walls of the chamber A to the desired degree without liability of overheating said walls at any point, or locality.

The lower end of chamber A is open and a receiving tray 4 is placed beneath said opening to receive the desiccated product. Aprons or screens, 5 and 6, of textile material, are concentrically attached to the exterior of chamber A and hang down into and around the receiving tray to provide for the escape of air and moisture without permitting the finely divided desiccated milk to escape. At the top of chamber A may also be provided perforations *a* for the escape of air and moisture, which perforations may also be screened if desired, although ordinarily they may be left open without screens, as the general tendency is for the desiccated product to descend by gravity.

B represents an atomizer comprising a central orifice 7 through which the fluid milk flows, and an annular concentric orifice 8 through which flows a current of heated air taken from the jacket 2 through a conduit 9. I preferably provide a needle valve 10 to control the flow of milk through the orifice 7, and to avoid interruption of the flow of milk through this reduced orifice, which is liable to occur. I provide a rotating shaft 11, preferably driven by a small electric motor 12. Attached to a crank wheel $f$ on the shaft 11 is a pitman 14 which engages and reciprocates a lever 15 connected to the stem of the valve 10 to periodically reciprocate said valve stem rotatably, thus preventing any interruption in the flow of milk.

The fresh milk is first treated in an evaporator C where its water contents is reduced one-half to two-thirds. The milk is then conducted to a storage tank D.

K represents a heater through which the milk passes from the tank D to the atomizer and in which the milk is heated to approximately 120° F. An air pressure of approximately forty to eighty pounds per square inch is employed in the storage tank to force the milk from the atomizer orifice rapidly in a finely divided state. A conduit 16 leads the milk from tank D to the atomizer. Air in considerable volume is forced by a blower or air compressor E into a storage and filtering tank F from which it is conducted by a conduit 17 to the jacket 2 of the tank A, where it is heated to approximately 180° F., and thence after being heated to the air orifice of the atomizer.

As the milk and heated air emerge from the atomizer the milk is finely divided into a mist or spray carried along in a downwardly directed current of heated air. The arrangement is such that the milk does not contact with the walls of the chamber until it is thoroughly dried and has reached the lower cooler portion of the chamber.

As the current is continually downwardly directed most of the air escapes at the bottom of the chamber through the screens, while the desiccated milk separates by gravity and falls into the receiving tray 4. A portion of the air may be allowed to escape through the openings at the top of chamber A, in which event it is ordinarily free from milk particles. The jacket 2 serves to keep the upper portion of the chamber heated and prevents any condensation of moisture on its inner walls to which the milk particles might adhere. In practice the volume of heated air supplied through the atomizer is sufficient to take up all the moisture from the milk and to prevent it from condensing or becoming chilled, until after the desiccated milk has been separated therefrom. I am therefore enabled to prevent the milk from contacting with the chamber walls except as a dry powder; to provide a straight unidirectional current assisted by gravity to carry the milk from the atomizer to the point of separation, and to effect a separation of the desiccated milk before any evidences of moisture appear in the air current.

As illustrated I preferably also provide a sectional cylindrical shell H surrounding the chamber A and forming a jacket space N between said shell and the exterior of chamber A to receive the heated air escaping through the screens 5 and 6, and after said heated air has been freed from the milk powder. A coil of pipe L in the jacket space N receives a supply of fresh air at 20 which becomes partially heated in its possage through the coil L by the current of escaping heated air in jacket space N, and is then conveyed by pipe 21 to the pump E. I am thus enabled to recover and return to chamber A for use a considerable portion of the heat contained in the escaping heated air.

The process as herein disclosed is capable of considerable modification without departing from the principle of my invention.

Having described my invention what I claim is:

1. The process of producing desiccated milk powder which comprises removing a portion of the water contents of the milk by evaporation, atomizing the heated condensed milk in a chamber, introducing sufficient heat to desiccate the milk in a current of heated air introduced through the atomizer, and separating the desiccated milk from the air and water vapor before condensation of the water vapor carried by the air occurs.

2. The process of producing desiccated milk powder which comprises condensing the milk by evaporation passing the condensed milk in a heated condition with an excess of heated air through an atomizer into a chamber having heated walls to produce a downwardly directed current of heated air and atomized milk, and separating the heated air and milk powder at the bottom of said chamber.

3. The process of producing desiccated milk powder which comprises passing previously condensed milk in a heated condition together with a relatively large volume of heated air through an atomizer into a chamber the walls of which are externally heated, to produce a current of heated air and atomized milk, and separating the desiccated milk at the exit of said chamber from the heated air and water vapor carried thereby before condensation of the water vapor occurs.

4. The process of producing desiccated milk powder which comprises passing fluid milk together with a relatively greater volume of heated air through an atomizer into a chamber to produce a continuous downwardly directed current of heated air and atomized milk, and separating the milk powder, partly by gravity, from the heated air, and allowing the heated air to escape at the sides of the lower portion of said chamber.

5. The process of producing desiccated milk powder which comprises removing a portion of the water contents of the milk by evaporation, atomizing the heated condensed milk by means of an excess of heated air in a chamber thereby utilizing the air employed to atomize the condensed milk as a carrier for all the heat necessary to desiccate the condensed milk, and separating the desiccated milk powder from the air while the air is still in a heated condition and free from moisture resulting from condensation of the water vapor carried thereby.

6. The process of producing desiccated milk powder which comprises passing fluid milk together with a relatively greater volume of heated air by separate orifices through an atomizer into a chamber, and mechanically agitating the milk in said atomizer to insure a continuous flow thereof, thereby producing a continuously flowing current of heated air and atomized milk through said chamber and separating the heated air from the milk powder at the opposite end of said chamber.

7. The process of producing desiccated milk powder which comprises passing fluid milk by one orifice into an atomizer agitating the milk in said orifice to insure a continuous flow, thereof, passing heated air in relatively greater volume into said atomizer and injecting the current of heated air and atomized milk from said atomizer into a chamber, separating the milk powder by gravity from the heated air and allowing said heated air to escape from said chamber.

8. The process of producing desiccated milk powder which comprises passing fluid milk into an atomizer and heated air in relatively greater volume into said atomizer, and ejecting a current of heated air and atomized milk from said atomizer into a chamber, separating the milk as a dry powder from said heated air, and transferring heat from the heated air after its separation from the milk powder into the current of air flowing to said atomizer.

In testimony whereof I have affixed my signature in presence of two witnesses.

DAVID J. HAUSS.

Witnesses:
C. W. Miles,
W. Thornton Bogert.